United States Patent [19]
Lawless

[11] Patent Number: 6,033,457
[45] Date of Patent: Mar. 7, 2000

[54] OXYGEN GENERATOR SYSTEM AND METHOD OF OPERATING THE SAME

[75] Inventor: William N. Lawless, Westerville, Ohio

[73] Assignee: OxyNet, Inc., Dublin, Ohio

[21] Appl. No.: 09/046,457

[22] Filed: Mar. 23, 1998

[51] Int. Cl.[7] .................................................. B01D 53/22
[52] U.S. Cl. .......................... 95/4; 95/67; 95/73; 95/79; 96/19; 96/25; 96/26; 96/55; 96/58; 422/121
[58] Field of Search .............................. 95/2, 6, 7, 4, 73, 95/79, 75, 67, 63, 69; 96/15, 18, 19, 25, 26, 55, 57, 58, 63; 422/121

[56] References Cited

U.S. PATENT DOCUMENTS

| | | |
|---|---|---|
| 4,449,990 | 5/1984 | Tedford, Jr. . |
| 4,789,388 | 12/1988 | Nishibata et al. ............................ 96/7 |
| 4,885,142 | 12/1989 | Suitor et al. ............................ 423/219 |
| 5,034,023 | 7/1991 | Thompson . |
| 5,108,465 | 4/1992 | Bauer et al. . |
| 5,169,506 | 12/1992 | Michaels . |
| 5,186,793 | 2/1993 | Michaels . |
| 5,205,990 | 4/1993 | Lawless . |
| 5,296,110 | 3/1994 | Tabatabaie-Raissi . |
| 5,397,443 | 3/1995 | Michaels . |
| 5,441,610 | 8/1995 | Renlund et al. . |
| 5,549,983 | 8/1996 | Yamanis .................................... 429/32 |
| 5,589,017 | 12/1996 | Minh ......................................... 156/87 |
| 5,611,845 | 3/1997 | Delp, II . |
| 5,643,355 | 7/1997 | Phillips et al. ................................ 96/4 |
| 5,855,762 | 1/1999 | Phillips et al. ............................... 95/19 |
| 5,865,877 | 2/1999 | Delp, II . |
| 5,922,178 | 7/1999 | Isenberg . |

FOREIGN PATENT DOCUMENTS

| | | |
|---|---|---|
| 726226A1 | 8/1996 | European Pat. Off. . |
| 778069A1 | 6/1997 | European Pat. Off. . |
| 9508360 | 3/1995 | WIPO . |

OTHER PUBLICATIONS

"Pressure Swing Adsorption (PSA) Oxygen", 1 page.

Physicochemical and electrochemical properties of solid solutions La1–xPbxMnO3(x=0.1—0.6), Authors: Yu S. Gaiduk, V V. Kharton, E.N. Naumovich, A.V. Nickolaev and V.V. Samokhval, from STN Easy: Search Results; Chemistry References, 1997 ACS, 1 page.

*Primary Examiner*—Duane S. Smith
*Attorney, Agent, or Firm*—Renner, Otto, Boisselle & Sklar, P.L.L.

[57] ABSTRACT

An oxygen generating system includes an oxygen generator having an oxygen ion conducting honeycomb structure and a heat exchanger thermally coupled to the oxygen generator. The system also includes a heater thermally coupled to the oxygen generator and a control module coupled to the oxygen generator and the heater. The control module monitors one or more of the system parameters and dynamically controls the oxygen generating system in response to the one or more system parameters such as, for example, varying the speed of a draft fan in the outlet waste air stream. A method of operating an oxygen generating system includes initializing the oxygen generating system in response to an operation status request and generating oxygen in an oxygen ion conducting honeycomb structure in response to a desired oxygen flow rate input. The method further includes monitoring one or more oxygen generating system parameters and controlling the oxygen generating system in response to the one or more oxygen generating system parameters.

43 Claims, 3 Drawing Sheets

OXYGEN GENERATOR SYSTEM AND METHOD OF OPERATING THE SAME

FIELD OF THE INVENTION

The present invention relates to an oxygen generating system, and more particularly, to a system and method for separating oxygen from a source gas and delivering the generated oxygen to a recipient wherein the system and method monitors and dynamically controls the oxygen generating system.

BACKGROUND OF THE INVENTION

In health care environments in which sick or elderly patients are cared for, a source of pure or high-concentration oxygen is often necessary to assist in the breathing process. In the past, such oxygen has been provided or supplemented through the use of pressurized tanks and/or liquid oxygen systems. Although the tanks have been suitable for their intended purpose, the tanks require pick-up, refilling, and delivery when the initial oxygen supply is depleted.

Some devices have been developed to separate, concentrate or generate oxygen from ambient air. Most of these systems are based on pressure-swing adsorption (PSA) systems which use a material such as zeolite as a mechanical trap (or molecular sieve) which operates as a physical separation material and allows oxygen to pass more readily than the other gaseous components. These devices are bulky, loud and degrade over their useful life as the zeolite material degrades. Furthermore, the concentration of produced oxygen is only about 95 percent pure and the purity level degrades over the lifetime of the system, and at higher flow rates. This characteristic is undesirable since standard oxygen generating systems typically require at least an 85 percent oxygen purity level to be therapeutically valuable. Consequently, regular servicing of the unit is required.

Oxygen generating systems are often used in nursing homes, private residences and other locations which are physically removed from the patient's primary care physician or the medical equipment service provider. Consequently, monitoring the oxygen generating system to determine the status of the oxygen purity level and other system parameters such as the oxygen flow rate are expensive and time-consuming because they require a physician or service technician to physically visit the patient to monitor and evaluate the oxygen generating system.

Consequently, there is a strong need in the art for an oxygen generating system which provides pure or high-concentration oxygen to a user in a quiet, efficient manner which does not occupy a lot of space, and allows a physician or equipment provider personnel to monitor the status of the system in an inexpensive and time-efficient manner.

SUMMARY OF THE INVENTION

According to one aspect of the present invention, an oxygen generating system utilizes an oxygen generator such as an oxygen ion conducting material to separate oxygen from an incoming source gas such as air. The oxygen generator interfaces with a heat exchanger and a heater to raise the temperature of the incoming source gas to a desired temperature level for efficient oxygen generation. The heat exchanger also removes the heat from the collected oxygen for safe use as well as from the waste gas for safe disposal and uses the collected heat to efficiently heat the incoming gas source and thereby save power.

According to another aspect of the present invention, the oxygen generating system is powered by a power supply that is capable of operation across a range of input voltages and frequencies. In addition, the oxygen generating system includes an on/off/standby feature which allows a user to turn off the system if the system will not be utilized for an extended period of time or alternatively place the system in a standby mode if a user does not immediately need oxygen, but expects to use the system in a relatively short period of time.

According to still another aspect of the present invention, a draft control system interfaces with the oxygen generator to dynamically control the temperature of the oxygen generator to maintain the system temperature within an optimal temperature range. The draft control system monitors the oxygen generator temperature and adjusts the speed of a draft fan accordingly to dynamically maintain the system within the optimal temperature range. The draft control system is operable to dynamically adjust the draft fan speed across a range of oxygen flow rates, thereby maximizing the efficiency of the oxygen generating system at any desired flow rate.

According to yet another aspect of the present invention, a control module monitors a plurality of system performance parameters and provides control signals to various components of the system in response to the performance parameters to maintain the efficiency and safety of the system. Exemplary performance parameters include: the oxygen generator temperature, the input voltage and current, the draft fan speed, the oxygen purity level and the oxygen flow rate.

According to another aspect of the present invention, the oxygen generator control module stores the performance parameters as data in a memory and transmits the data via a modem and a data link to a remote location, such as to a service provider computer to allow for remote monitoring of the oxygen generating system by service personnel. Alternatively, service personnel may contact the oxygen generating system via the modem and the data link and download the data within the memory and/or view the data for remote analysis.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will be described in conjunction with the accompanying figures wherein like reference numerals will be referred to like elements throughout. The oxygen generating system of the present invention provides a source of substantially pure oxygen to a user, wherein the system is quiet, small and efficient. Furthermore, the oxygen generating system of the present invention provides a safety feature for preventing harm to a user in the event of a system failure as well as a remote monitoring feature to thereby monitor the operating conditions and performance indicia of the system in an efficient manner.

According to a preferred embodiment of the invention, the oxygen generator includes an oxygen ion conducting material such as a stabilized bismuth oxide ceramic honeycomb structure having a first plurality of channels for receiving a source gas such as air and a second plurality of channels for collecting substantially pure oxygen which conducts through the bismuth oxide channel walls. An exemplary structure and method of operation of such an oxygen ion conducting honeycomb structure is described in detail in U.S. Pat. No. 5,205,990 issued to William N. Lawless, which is hereby incorporated by reference in its entirety. The use of an oxygen ion conducting material provides a substantially quiet and efficient method of generating substantially pure oxygen. A heat exchanger and a heater operate in conjunction with the oxygen generator to generate an optimal operating temperature for the oxygen generator, which is preferably about 600° C. The heat exchanger takes the generated oxygen and waste gas (which is still approximately 600° C.) and removes the heat from those gases for subsequent use in maintaining the system at its desired optimal temperature range, thereby saving power.

The oxygen generating system of the present invention receives power to satisfy its power requirements from a power supply which preferably plugs into a standard AC wall outlet. The power supply is operable to provide adequate power for the oxygen generating system over a range of input AC voltages and frequencies. For example, if the system is being used in the United States, the power supply is operable to utilize the standard 120 volt AC power operating at 60 Hz. Alternatively, in Europe, the power supply is operable to utilize a different input voltage and different frequency to allow the system to operate across a variety of input voltages and frequencies.

The oxygen generating system of the present invention also includes an on/off/standby mode option which allows a user greater flexibility in operating the system. Unlike prior systems which allow the system to be only on or off, the present invention includes a standby mode which discontinues power supplied directly to the oxygen generator (which separates the oxygen from the incoming source gas), yet maintains power to the heating system to keep the oxygen generator within or near to its optimal temperature range. Consequently, when a user wishes to later obtain oxygen from the system, the oxygen generator is already within its desired temperature range, thereby allowing the system to provide the desired oxygen substantially immediately. This advantageous feature allows a user to discontinue generation of oxygen for short periods of time without requiring a delay time to heat up the system before oxygen generation can be re-initiated. A user may place the oxygen generating system in the standby mode if the user will need to use the oxygen generating system again in a short time. An example of such a use is a patient needing to go to the grocery store. In such an event, the patient would place the system in the standby mode and take bottled oxygen for the trip to the store. After a short period of time, the patient returns and wishes to use the oxygen generator system immediately. The patient may then simply put the system in the "on" mode and immediately the system generates oxygen since the oxygen generator is still at its operating temperature. Although the heaters are still on, power is not being delivered directly to the oxygen generator while in the standby mode, consequently the power consumption of the system is reduced.

The oxygen generating system of the present invention also includes safety features to protect the user from potential harm. For example, the system includes an input filter which prevents impurities or foreign matter from entering and clogging or contaminating the system. The system also includes a safety valve within an output oxygen flowpath which senses the output oxygen purity and/or temperature and diverts the output oxygen away from the user if a failure or impurity is detected. In this manner, the oxygen generating system prevents a user from receiving either impure oxygen or oxygen that is outside of a desired temperature comfort range.

The oxygen generating system of the present invention also includes a control module which dynamically monitors a plurality of performance characteristics and user input values and dynamically controls the operation of the oxygen generating system to allow for the efficient operation of the system. In one embodiment of the present invention, the control module operates in conjunction with a draft fan within a waste gas outlet port of the oxygen generating system to dynamically control and thereby maintain the oxygen generating system temperature within an optimal temperature range over a variety of desired oxygen flow rates.

The control module of the present invention increases the speed of the draft fan if the temperature of the oxygen generating system is increasing above a predetermined temperature threshold and likewise decreases the speed of the draft fan if the oxygen generating system temperature falls below another predetermined temperature threshold. Consequently, the oxygen generating system is maintained within its optimal temperature range, thereby maximizing the efficiency of operation of the system and conserving power. In addition, for example, at low flow rates, if the draft fan speed is at a minimum speed and therefore can not be slowed further (since a minimum draft is preferred) and the oxygen generator temperature is still below a predetermined temperature threshold, the system re-initiates or increases power to the heater to provide additional heat to the system and thereby place the oxygen generator within its optimal temperature range.

The control module of the present invention also stores one or more of the various operating characteristics of the oxygen generating system to a memory on either a continuous or a periodic basis. The data which is collected and stored in the memory may then be accessed remotely via a modem and a data link to allow for a cost-effective method of monitoring the system and ensuring the safety of the system for the user without the expensive and time-consuming process of sending service personnel or physicians to the patient's home.

Figure 1:
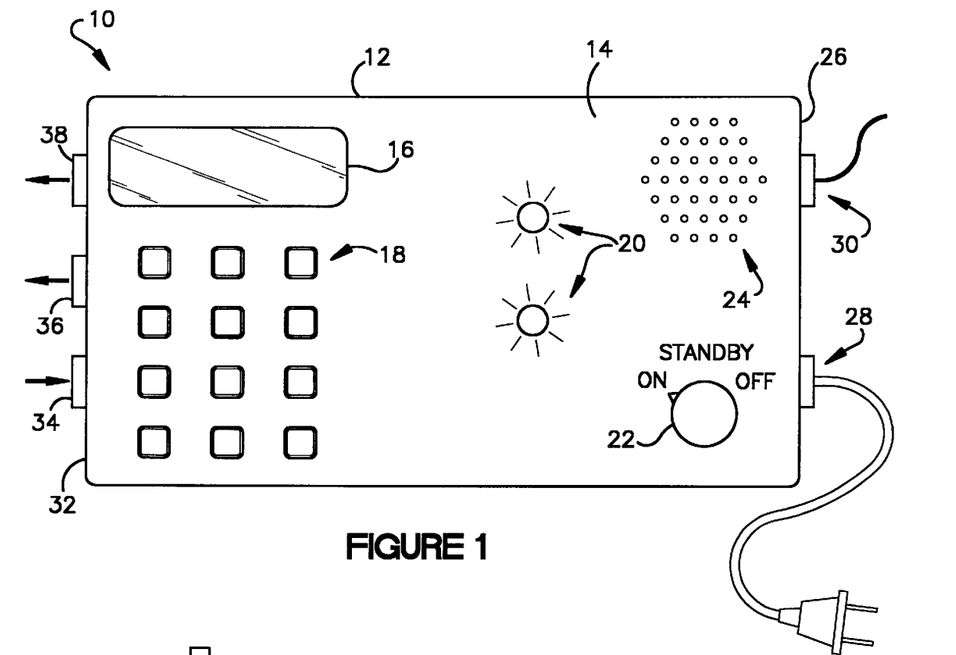
FIG. 1 is a front view illustrating an oxygen generating system in accordance with the present invention.

A detailed explanation of the present invention including an exemplary structure and method of operation will be discussed in conjunction with the figures. FIG. 1 is a front view of an oxygen generating system 10 according to one embodiment of the present invention. The system 10 includes a generation unit 12 having a front face 14 in which a display 16 and a plurality of buttons 18 (or keypad) are contained. The front face 14 also includes a plurality of lights 20 to provide a visual indication of system operation (such as a green light being on for normal operation and a red light turning on when a failure condition is detected or when servicing is recommended) and an operation status knob 22 which allows a user to select an operational mode for the system 10. The front face 14 also preferably includes an audio grating 24 (or a speaker grille) which provides one or more apertures through the front face 14 to allow audio signals to pass through the front face 14 from a speaker (not shown) within the unit (if desired) to provide an indication of the system's status. The generation unit 12 also includes a first side face 26 which contains a power connector 28 for providing power to the unit 12 from a typical AC outlet and a modem/data connector 30 for connection of the generation unit 12 to a telephone jack for transmission or reception of data signals. Preferably the system 10 operates on standard AC power. Alternatively, however, the system 10 may also contain one or more slots for housing one or more batteries or other portable power sources which allow the system 10 to be portable if desired. For example, the system 10 may receive at least partial power from a vehicle power source to thereby allow use of the system 10 on the road.

In addition, although the system 10 preferably uses a telephone line for the remote transfer of data, other communication methods are also contemplated as falling within the scope of the present invention. For example, the system 10 may be electrically coupled to a personal computer which utilizes the Internet (with accompanying encryption and security measures to ensure patient confidentiality and privacy, if desired) to transfer the data remotely. In another alternative embodiment of the present invention, a hardwired connection may be replaced by RF data communication or an IR link for transfer of the data to thereby minimize the number of wires, etc.

The generation unit 12 also includes a second side face 32 which contains an inlet air port 34, an outlet air port 36 and an outlet oxygen port 38. Although the oxygen generator system 10 is illustrated as a box-type unit in FIG. 1, it is appreciated that the system 10 may be configured in numerous physical configurations and each is contemplated as falling within the scope of the present invention. In addition, although the operation status knob 22 is illustrated as a knob, it is understood that the knob 22 may also be a switch, a push-button arrangement, or even a voice-activated status control mechanism. Likewise, although the display 16 and buttons 18 are configured in an exemplary manner in FIG. 1, it is understood that a plurality of different types of visual indicia and input and control mechanisms may be employed and are contemplated as falling within the scope of the present invention.

Figure 2:
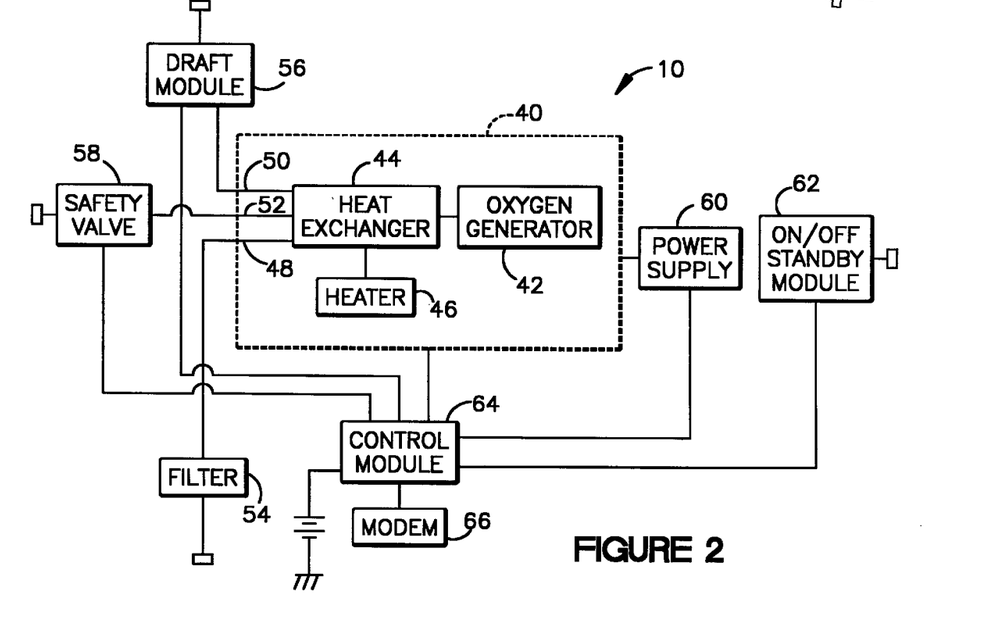
FIG. 2 is a block diagram illustrating the components of the oxygen generating system in accordance with the present invention.

FIG. 2 is a block diagram which illustrates a system configuration of the oxygen generator system 10 of FIG. 1. The system 10 preferably includes a thermal encasement 40 having a preferred physical dimension of about 16"×8"×8" which houses an oxygen generator 42, a heat exchanger 44 and one or more heaters 46. The one or more heaters 46 are in thermal communication with the oxygen generator 42 to provide heat to the generator 42 to thereby place the oxygen generator 42 in its optimal temperature range, which in the preferred embodiment is about 600° C. Any type of heater may be utilized, although compact, low power heaters are preferred such as flat panel heaters, nichrome wire heaters or resistive heaters. Likewise, the heat exchanger 44 is in thermal communication with the oxygen generator 42 to collect heat from the exit gases, namely the collected oxygen and waste gas (for example, oxygen-depleted air) and efficiently utilize the collected heat for maintaining the oxygen generator 42 in its optimal temperature range. Consequently, the amount of power needed to maintain the oxygen generator 42 within its optimal temperature range may be minimized. In addition, all the work performed by the oxygen generator 42 (i.e., the ionic current conduction through the honeycomb walls) is are given off as heat. The heat exchanger 44 therefore efficiently utilizes even the ionic conduction of the oxygen generator 42 to maintain the temperature of the system 10 within its optimal range.

A brief description of the interrelationships of the oxygen generator 42, heat exchanger 44 and the heater 46 will now be described. Air enters the heat exchanger 44 via the air inlet port 48 with a source gas at approximately 20–30° C. (preferably ambient temperature), wherein the heat exchanger 44 raises the temperature of the incoming source gas (preferably air) to approximately 600° C. (although other elevated temperature ranges may be used for other ceramic materials or geometric configurations). The incoming source gas is raised to the optimal temperature by one or more of the following processes: collecting the heat from the exit gases from the oxygen generator 42 and imparting the collected heat to the incoming source gas and/or imparting heat to the incoming source gas via the heater 46. The generated oxygen and the waste gas (preferably oxygen-depleted air) exit the oxygen generator 42 and enter the heat exchanger 44 wherein the heat exchanger 44 removes the heat of the exit gases, which are at approximately 600° C. so that the generated oxygen and the waste gas exit the heat exchanger 44 at the air outlet port 50 and the oxygen outlet port 52, respectively, at a breathable temperature (e.g., approximately 20–30° C.). Consequently, the generated oxygen may then be utilized at a temperature which is comfortable and safe for the patient.

The oxygen generator 42, the heat exchanger 44 and the heater 46 are preferably surrounded by the encasement 40 which is thermally insulative to prevent heat from dissipating from the system 10. Preferably a highly thermally insulative rigid sleeve surrounds the components 42, 44 and 46 having dimensions of about 16" long, 8" high and 8" deep, however, other dimensions are also appreciated as falling within the scope of the present invention as may be desired.

A filter 54 is preferably inserted within the incoming air flow path before the air inlet port 48 to prevent contaminants or foreign objects from entering the heat exchanger 44 and oxygen generator 42. For example, the filter 54 will prevent animal hair, dust, food particles, lint, etc. from reaching the air inlet port 48. The filter 54 is preferably a removable filter 54 for easy replacement or cleaning. The filter 54 need not be a bacterial filter since the oxygen generator 42 preferably operates at a temperature range of about 600° C. Consequently, any potential bacteria entering the air inlet port 48 will not survive the high temperatures and the filter 54 may be a simple, inexpensive filter such as a wire mesh.

A draft module 56 is preferably placed within the outlet air flow path and is connected to the air outlet (or waste air) port 50 of the heat exchanger 44. The draft module 56 is operable to dynamically alter the draft of the exit waste gas from the outlet port 50 to maintain the temperature of the oxygen generator 42 within its optimal temperature range. The draft module 56 preferably includes a draft fan, however, any type of draft inducing mechanism is contemplated as falling within the scope of the present invention.

A safety valve 58 is preferably included within the outlet oxygen flow path and is coupled to the oxygen outlet port 52 of the system 10. The safety valve 58 is operable to divert the generated oxygen flow path away from the user if an unsafe operating condition is detected, as will be described infra. In addition, a power supply 60, an on/off/standby module 62 and a control module 64 operate together to provide power control and other control functions for the system 10. The power supply 60 provides power to the oxygen generator 42 to thereby facilitate the generation of oxygen via the conduction of oxygen ions through the channel walls of the oxygen generator 42.

The on/off/standby module 62 operates in conjunction with the control module 64 to provide flexibility in use of the system 10. For example, when the user selects the "on" position, the control module 64 senses that operating status request and provides a control signal to the power supply 60 to power the oxygen generator 42. The control module 64 also provides a control signal to the heater 46, as needed, to provide heat to the oxygen generator 42 to thereby place the system within its optimal operating temperature range. When the on/off/standby module 62 is placed in the "off" mode, the control module 64 senses the operating status request and deactivates both the power supply 60 and the heater 46. In a third situation, when a user places the on/off/standby module 62 in the "standby" mode, the control module 64 senses the operating status request and deactivates the power supply 60 while maintaining power to the heater 46, as needed, to maintain the oxygen generator 42 within its optimal temperature range. Consequently, when the user wishes to again generate oxygen and places the on/off/standby module 62 in the "on" mode, the control module 64 can simply re-initiate power to the power supply 60 and immediately begin the generation of oxygen within the oxygen generator 42.

The oxygen generator system 10 of FIG. 2 also includes a modem 66 coupled to the control module 64 for the transmission of data from the oxygen generator system 10 to a remote site for either monitoring and/or trending analysis. The control module 64 is operable to monitor the status of one or more of the various operating characteristics of the system 10 and save the collected data within the module 64. The collected data are then either accessed remotely via the modem 66 by a service personnel or a physician or, alternatively, the control module 64 may constantly or periodically transmit the collected data to a remote site via the modem 66 for monitoring and/or trending.

The control module 64 senses the operating characteristics of the system 10 via a plurality of sensors (not shown). For example, the control module 64 may sense the temperature of the oxygen generator 42 in one of a plurality of ways. The control module 64 may sense the temperature of the oxygen generator 42 by monitoring a thermocouple which may be physically attached to the oxygen generator 42 or, alternatively, place a thermocouple within an outlet oxygen or outlet waste gas flow path to monitor the temperature of the output gases (which will be approximately the temperature of the oxygen generator 42). Any type of thermal sensor and method of sensing the temperature of the system is contemplated as falling within the scope of the present invention. If the sensed temperature falls outside a preferred temperature range (preferably chosen to maximize the efficiency of the system 10) the control module 64 relays a control signal to the draft module 56 to increase or decrease a draft fan speed as appropriate to again place the oxygen generator 42 within its optimal temperature range.

The control module 64 also monitors the input voltage and the input current supplied by the power supply 60 to the oxygen generator 42. As is known by those skilled in the art, the generated oxygen flow rate is a function of the input current to the oxygen generator 42. Consequently, since the control module 64 receives the desired input flow rate of the user via, for example, the keypad 18 of FIG. 1, the control module 64 monitors the power supply 60 to insure that the desired input power parameters are being accurately supplied to the oxygen generator 42.

The control module 64 also monitors the speed of the draft fan within the draft module 56 to ensure that the draft module 56 is operating at least at a minimum draft fan speed to thereby ensure sufficient draft within the system 10. Consequently, if the temperature of the system 10 needs to be further increased and the speed of the draft fan within the draft module 56 is at its minimum speed, the control module 64 may provide a control signal to the heater 46 to turn on or alternatively to increase the amount of heat being provided to the oxygen generator 42 to thereby ensure operation of the system within its optimal temperature range which maximizes the efficiency of the system 10.

Lastly, the control module 64 may also monitor an oxygen purity level and temperature of the outlet oxygen from the oxygen outlet port 52 to insure that the generated oxygen is both at the desired purity level and within a comfortable temperature for use by the patient. In one embodiment of the present invention, the oxygen purity level may be monitored by an oxygen sensor within the oxygen outlet port 52. Alternatively, since the purity of the generated oxygen may also be extrapolated from the operating parameters of the system 10, the control module 64 may also calculate the oxygen purity level by monitoring other system characteristics such as the temperature, voltage and current. If a system condition is detected within the oxygen outlet port 52 that exceeds or falls below any predetermined performance criteria, the control module 64 activates the safety valve 58 to divert the oxygen from the oxygen outlet port 52 away from the user. In this manner, the safety valve 58 may include a solenoid-type activated valve or any other type of gas flow diversion mechanism. Although only a few performance criteria have been enunciated supra, it is understood that many types of other performance characteristics may also be monitored by the control module 64 and are contemplated as falling within the scope of the present invention. An exemplary list of such parameters may include, but is not limited to, the following: percentage of oxygen in the outlet stream, the input voltage, the draft fan speed and the temperature of various components such as the power supply heat sink, etc.

Figure 3:
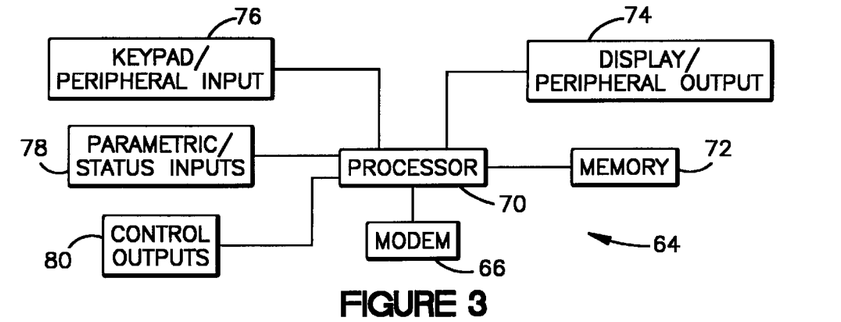
FIG. 3 is a block diagram illustrating in greater detail the control module of FIG. 2 in accordance with the present invention.

Turning now to the details of the system 10, the control module 64 of FIG. 2 is illustrated in greater detail in the block diagram of FIG. 3. The control module 64 includes a processor 70 coupled to a memory 72, a display (or one or more peripheral outputs) 74 and a keypad (or one or more peripheral inputs) 76. The processor 70 is also electrically coupled to one or more parametric or status-type inputs 78 (otherwise referred to as the sensors) and the processor 70 provides one or more control output signals 80 to the various system components. The processor 70 is also coupled to the modem 66 which is illustrated in FIG. 3 for easy reference.

The processor 70 interacts with the various components of FIG. 3 in the following manner. The processor 70 receives input signals from a user or service personnel preferably through the keypad 18 or other types of peripheral inputs 76, which coincide with the keypad 18, and the on/off/standby control knob 22 of FIG. 1. The processor 70 receives information from the peripheral inputs 76 which reflect the desired control status of the system 10 as well as the desired flow rate for the generation of oxygen. The processor 70 then generates and provides associated control signals via the control outputs 80 to the various components of the system 10 in response to the peripheral inputs 76.

In an alternative embodiment of the present invention, if there is concern that a patient, family member or an otherwise unauthorized individual may alter the oxygen flow rates from the physician's recommended range and such deviation may result in health risks to the patient, the present invention contemplates the setting of such flow rates remotely via a physician or service personnel through the modem 66. In such a configuration, a user would be unable to modify the oxygen flow rate locally and instead the peripheral input data would be received from the modem 66 instead of the local peripheral inputs 76.

The processor 70, upon receiving the inputs (via either the keypad/peripheral input 76 or from the modem 66) preferably provides display data to the display/peripheral outputs 74 to provide a visual indication (if desired) of the present oxygen flow rate being generated. Such a visual indication would be provided, for example, via the display 16 of FIG. 1. Alternatively, the processor 70 may simply provide a control status signal to the display/peripheral outputs 74 to illustrate that the desired flow rate is being generated within an acceptable range without displaying the actual oxygen flow rate. For example, such an output would be the activating of a light 20 on the front face 14 of the system 10, as illustrated in FIG. 1. Therefore, if the oxygen flow rate being generated is within the acceptable bounds, the processor 70 would activate the peripheral output 74 to, for example, turn on a green light 20 on the front face 14 of the system 10. In yet another alternative embodiment of the present invention, the processor 70 is operable to output audio information to the display/peripheral outputs 74 which may, for example, consist of a voice chip and a speaker to provide an audio output to the user via the audio grating 24 of FIG. 1. Therefore, if the patient is visually impaired, the system 10 is operable to provide an audible signal to the user to indicate that the system is operating within its acceptable parameters. Such exemplary audio outputs may include a series of beeps or an audible voice-type message generated via a voice chip, as is well known and understood by those skilled in the art.

The processor 70 of FIG. 3 also receives parametric/status-type inputs 78 from the various components of the system 10. As discussed supra, the parametric or status-type inputs are preferably received from one or more sensors within the system 10. The processor 70 receives the inputs such as temperature, voltage and current and provides dynamic control to the system 10 in response to the inputs. The processor 70 also preferably stores the received parametric status inputs to the memory 72. Preferably, the processor 70 has an internal clock which may store the received data on a periodic basis based upon fixed or user-defined software within the processor 70. For example, if a service technician wishes to receive data on an hourly basis, the processor 70 may be programmed to store the received parametric or status-type inputs 78 to the memory 72 on an hourly basis. Alternatively, such data may be stored more often or less often, such as for example, a daily or weekly basis. Consequently, a service technician or a physician may access the system 10 via the modem 66 and thereby view or transmit the data within the memory 72 through the processor 70. In addition, a back-up battery is preferably provided to allow the system 10 to store data when the system 10 is unplugged or turned off and also to allow the alarm functions to operate if the power fails.

Figures 4, 5:
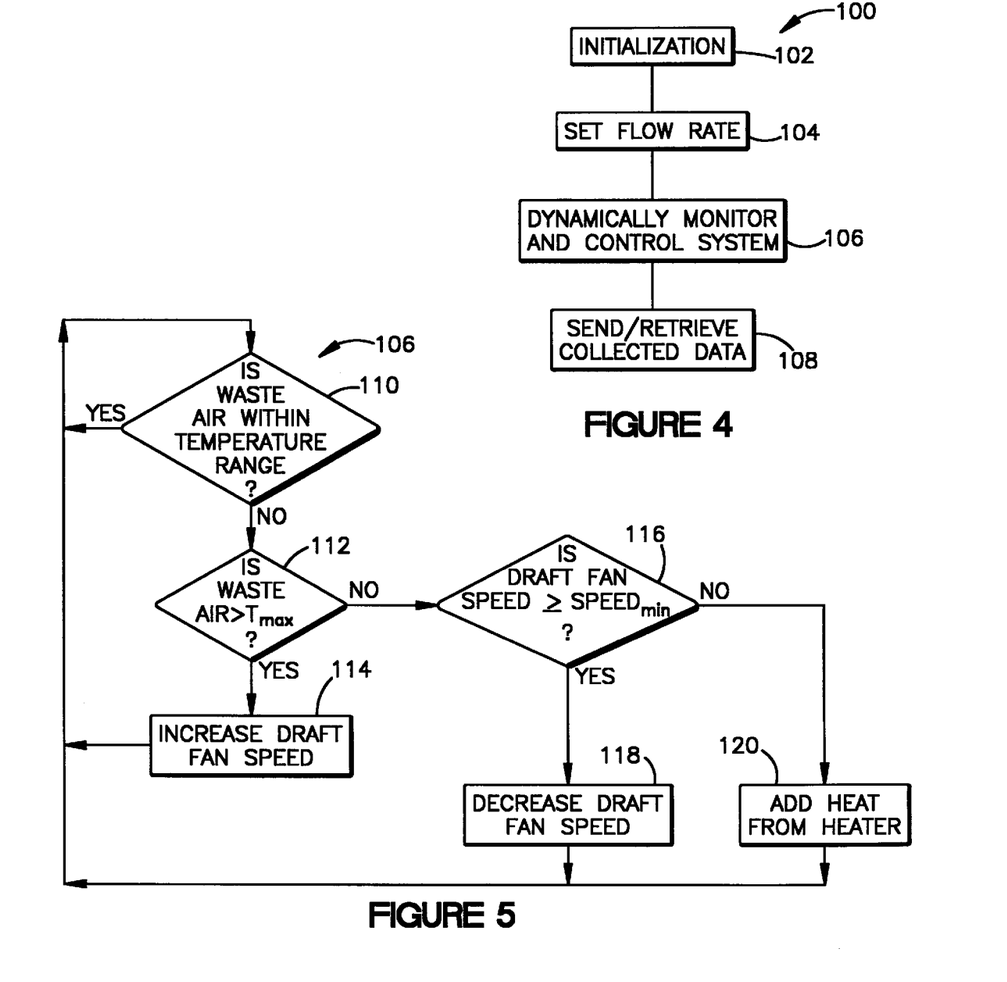
FIG. 4 is a flow chart diagram illustrating steps in the operation of the oxygen generating system in accordance with the present invention.
FIG. 5 is a flow chart diagram illustrating one aspect of the dynamic monitoring feature in accordance with the present invention.

A method of operating the oxygen generating system 10 of FIGS. 1–3 according to one embodiment of the present invention is illustrated in FIG. 4 as reference numeral 100. The method 100 begins at step 102 with an initialization of the oxygen generating system 10. The initialization of the system 10 includes changing the mode of the system 10 from the "off" mode to either the "on" or the "standby" mode via the operation control status knob 22 illustrated in FIG. 1. If at step 102, the status control knob 22 is placed in the "on" position, the control module 64 receives that input control request from the keypad/peripheral input 76 illustrated in FIG. 3 and turns on the heater 46 using a control output signal 80. The control module 64 also preferably turns on the draft fan within the draft module 56 at a low speed to facilitate a uniform heating of the oxygen generator 42. The control module 64 then preferably waits a predetermined period of time to ensure that the oxygen generator 42 has reached its optimal temperature range. Alternatively, the control module 64 may monitor the temperature of the oxygen generator 42 directly via either a thermocouple attached to the generator 42 or in an outlet flow path of either the oxygen or waste gas to determine whether the generator 42 is at its optimal temperature range.

Once the oxygen generator 42 is at its proper temperature, the initialization step 102 in the "on" mode continues with the control module 64 triggering the power supply 60 to provide power to the oxygen generator 42 for the generation of oxygen. The method 100 continues at step 104 where the desired flow rate is set by the user preferably via the keypad 18 on the front face 14 of the system 10 in FIG. 1. The keypad 18 corresponds to a keypad/peripheral input 76 of FIG. 3 which the processor 70 within the control module 64 utilizes to set the power supply 60 at the appropriate input voltage and input current level. Since the flow rate of generated oxygen within the oxygen generator 42 is a function of the input current from the power supply 60, if the flow rate of step 104 is high the control module 64 will increase the current for the power supply 60, alternatively if the flow rate is set at a low flow rate, the control module 64 will decrease the current of the power supply 60. Although FIG. 4 illustrates setting the flow rate of step 104 after initialization, it is understood that step 104 may alternatively be executed before or concurrent with step 102, as may be desired.

Once initialization is complete and the flow rate is set at steps 102 and 104, respectively, the system 100 is monitored and dynamically controlled at step 106 via the control module 64 of FIG. 2. As discussed supra, the control module 64 monitors and dynamically controls the system 10 via the parametric/status-type inputs 78 of FIG. 3 which consists of one or more sensors throughout the system 10. For example, the control module 64 may monitor the input voltage and the input current from the power supply 60 to the oxygen generator 42, the temperature of the oxygen generator 42, the temperature of the output oxygen through the oxygen outlet port 52 of FIG. 2, the draft fan speed in the draft module 56, as well as other system characteristics as desired. The control module 64 monitors one or more of the performance characteristics by monitoring the various sensors and preferably converting the data from an analog to a digital format (via, for example, an analog-to-digital (A/D)

converter) and storing it in the memory 72, as illustrated in FIG. 3. The control module 64 also dynamically controls the system 10 by providing one or more control output signals 80 to the various system components in response to the monitored system characteristics to thereby ensure the safety, reliability and efficient performance of the system 10.

The method 100 also includes either the sending or the retrieving of the collected data within the memory 72 at step 108. As discussed supra, the control module 64 saves the various parametric/status-type input characteristics from the various sensors in the system 10 in the memory 72 on a periodic basis which is preferably dictated by user-modifiable software within the processor 70. The processor 70 may then periodically retrieve the data from the memory 72 and transmit the data to a remote location via the modem 66 for monitoring and/or trending analysis by either a physician or equipment service personnel. Alternatively, the data may be retrieved from the memory 72 via the processor 70 and the modem 66 from a remote location by either a physician or service provider to analyze the status and performance characteristics of the system 10 on a periodic basis. As discussed earlier, this step of the method 100 advantageously allows the safety and efficiency of the system to be ensured at a low cost and in an efficient manner since such data may be analyzed without a physician or an equipment technician traveling to the site of the system 10. Furthermore since such analysis is easy and inexpensive, such monitoring may occur substantially more frequently which allows degraded conditions to be detected and proactively addressed before a system failure occurs.

FIG. 5 is a flow chart diagram illustrating in greater detail one embodiment of the step 106 of FIG. 4, that is, the step of monitoring and dynamically controlling the system 10. Although the step 106 is preferably performed in the following manner, it is understood that any method of monitoring and dynamically controlling the system 10 is contemplated as falling within the scope of the present invention. The step 106 begins with the control module 64 querying whether the waste gas (preferably oxygen-depleted air) exiting the oxygen generator 42 is within a desired temperature range at step 110. In a preferred embodiment of the present invention, the optimal temperature range is a breathable temperature (e.g., approximately 20–30° C., although a broader range may exist for various individuals).

If at step 110, the control module 64 determines that the waste gas is within the desired temperature range, (YES) the control and monitoring step 106 returns again to the query and continues the querying at step 110 to ensure optimal performance of the oxygen generator 42. If, however, the control module 64 determines that the waste gas of the oxygen generator 42 is not within the desired temperature range (NO) the control module 64 makes a second query at step 112 to determine whether the waste gas is greater than a predetermined temperature threshold ($T_{max}$). If at step 112, the answer is in the affirmative (YES), the control module 64 provides a control output 80 to the draft module 56 to increase the draft fan speed at step 114. An increase in the draft fan speed increases the draft in the air outlet port 50 which thereby cools the oxygen generator 42 to bring it down below $T_{max}$. The control module 64 then returns to step 110 and continues to query whether the oxygen generator 42 is within its optimal temperature range.

If at step 112, the control module 64 determines that the waste gas is not exceeding the maximum temperature threshold (NO), then the control module 64 knows that the waste gas is below the optimal temperature range. The control module 64 then makes another query at step 116 to determine whether the present draft fan speed is greater than or equal to the minimum draft fan speed threshold ($SPEED_{min}$). If the answer to the query at step 116 is YES, then the control module 64 knows that there is still remaining margin left to reduce the draft fan speed of the draft module 56. Consequently, the control module 64 then decreases the draft fan speed at step 118. A decrease in the draft fan speed at step 118 causes the draft within the waste gas outlet port 50 to decrease thereby causing the oxygen generator 42 to increase in temperature. If, however, the control module 64 determines at step 116 that the draft fan speed can not be decreased further (NO), then the control module 64 proceeds to step 120 and activates the heater 46 to increase the temperature of the oxygen generator 42. The control module 64 preferably determines that the draft fan speed is at its minimum threshold when any further decrease in draft by the draft module 56 will cause the system 10 to operate in an inefficient manner. The control module 64, after taking its collective actions in response to the temperature of the oxygen generator 42, then returns to step 110 to continue its monitoring function. In this manner, the control module 64 continuously monitors and dynamically controls the system to ensure a safe and efficient operation of the oxygen generator 42.

Although FIG. 5 illustrates one exemplary manner of monitoring and dynamically controlling the oxygen generating system 10, various methods of monitoring the system and providing dynamic control to maintain a safe and efficient operation of the system 10 is contemplated by the present invention. For example, although in step 110 of FIG. 5 the waste gas temperature is monitored, other portions of the system 10 may also be monitored, such as the temperature of the oxygen generator 42 itself or the outlet oxygen flow path. Furthermore, any other type of performance characteristic, parameter or criteria may be utilized to efficiently monitor the system and are contemplated as falling within the scope of the present invention.

Figure 6:
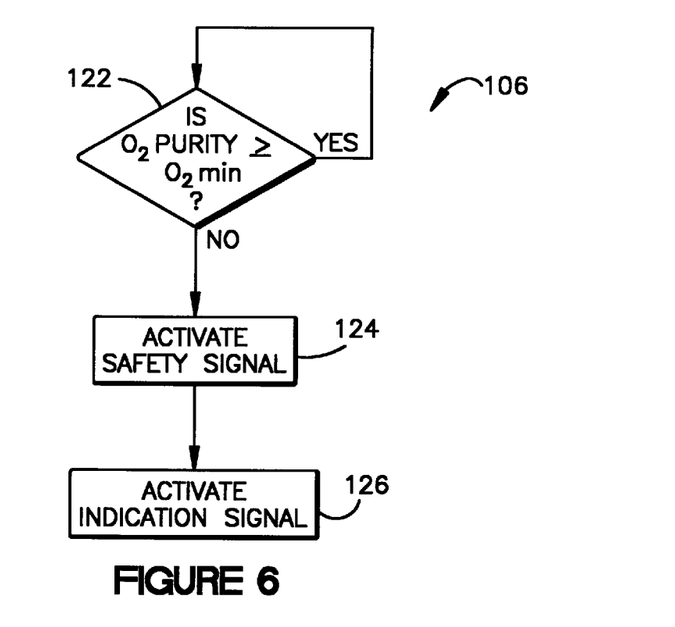
FIG. 6 is a flow chart diagram illustrating another aspect of the dynamic monitoring feature in accordance with the present invention.

Turning now to FIG. 6, another embodiment of the present invention is illustrated in which the control module 64 monitors and dynamically controls the system 10 at step 106 of FIG. 4. In this particular embodiment of the present invention, the control module 64 monitors the oxygen purity level of the outlet oxygen from the outlet port 52 at step 122. If the oxygen purity level is greater than an oxygen threshold ($O_{2min}$)(YES), the control module 64 maintains the system 10 in its present condition. If, however, the detected oxygen purity level falls below the minimum threshold (NO) the control module 64 activates an alarm at step 124. Although not required, in an alternative embodiment, the safety valve 58 may be activated such as by providing a control output signal 80 to activate a solenoid within the safety valve 58 to divert the oxygen flow away from the patient. In either case, once the alarm is activated and/or the safety valve 58 has been activated in step 124, the control module 64 preferably activates an indication signal at step 126 such as, for example, activating a red light 20 on the front face 14 of the system 10 of FIG. 1.

Alternatively, or in addition to the above, the control module 64 may provide an audible signal through a speaker and the audio grating 24 and also send an immediate indication or warning signal to a remote user or physician via the modem 66 and the data link. In this manner, step 126 provides an immediate indication of a system malfunction or degradation to the user, physician and/or equipment service personnel to provide for an immediate response. As discussed supra, various methods for detecting the oxygen purity level may be utilized and are contemplated as falling within the scope of the present invention. In one embodiment of the present invention, an oxygen sensor may be located within the outlet oxygen flow path downstream from the oxygen outlet port 52. In another alternative embodiment of the present invention, the control module 64 may extrapolate the oxygen purity level by monitoring the temperature, the input voltage and the input current of the system 10. Other methods may also be utilized and are contemplated as falling within the scope of the present invention.

Figure 7:
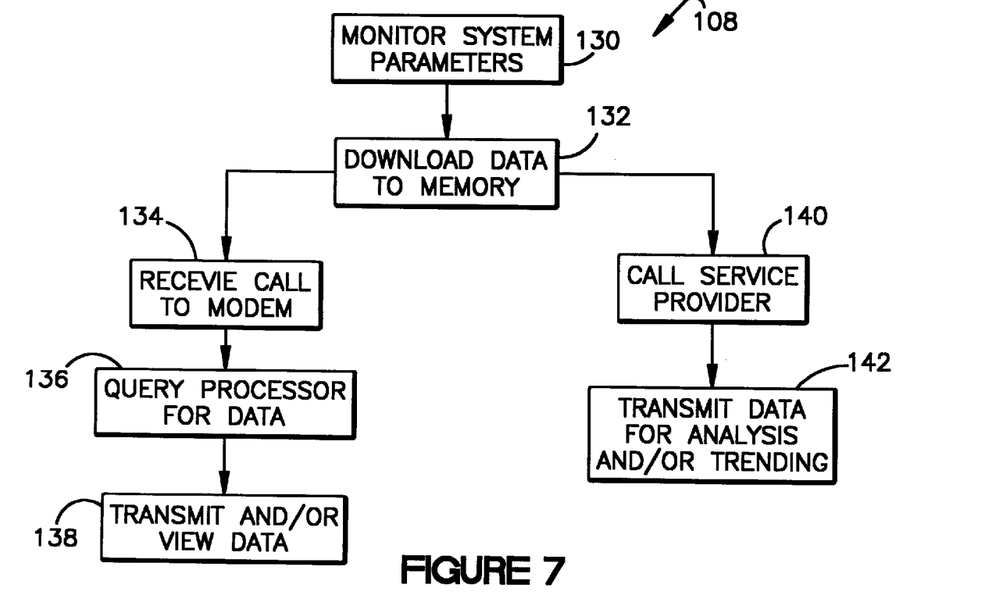
FIG. 7 is a flow chart diagram illustrating the collection and retrieval of data for remote analysis with accordance with the present invention.

FIG. 7 is a block diagram illustrating various options in the sending and/or retrieval of collected data within the control module 64 (which corresponds to step 108 in FIG. 4). Step 108 begins with the monitoring of one or more system parameters at step 130 which includes the receiving of parametric/status-type inputs 78, as illustrated in FIG. 3. As discussed previously, the processor 70, in accordance with internal programming which may be user-defined, periodically stores at step 132 the collected system parameters in the memory 72. Such time frames may be relatively continuous or may occur periodically: either hourly, daily, weekly, etc. Consequently, the size of the memory 72 is preferably sufficiently large to store the downloaded data in accordance with the user-defined data collection rate.

In one embodiment of the present invention, a remote site such as a physician or equipment service provider will call the oxygen generating system over a telephone line or other suitable data link at step 134 and query the processor 70 at step 136 for the stored data. Preferably, the processor 70 is operable to investigate the query (such as, for example, through passwords or encryption techniques) to ensure that an authorized individual is requesting the downloaded data. In this manner, the patient's confidentiality and privacy is maintained. Once authorization has been procured, the processor 70 transmits the data at step 138 (or alternatively a copy of the data) within the memory 72 to the remote site via the modem 66 and the data link. The remote site may then utilize the data as it sees fit for analysis and/or trending purposes. Alternatively, the remote user may simply view the data within the memory 72.

In another alternative embodiment of the present invention, the oxygen generating system 10 may periodically call the service provider at time intervals dictated by the user-defined software within the processor 70 at step 140. The call is made via the processor 70 and the modem 66 over the data link. Once the data link is established, the data is transmitted to the remote site for analysis and/or trending purposes at step 142. In this manner, the data from the memory 72 is transmitted to a central site on a periodic basis without the need for an individual having to individually contact the one or more oxygen generators which may be present at multiple sites. In addition, the alternative embodiment of steps 140 and 142 allow for the service provider to be contacted at step 140 if any safety or reliability issue is detected by the control module 64. For example, if the control module 64 detects an unsafe temperature in the outlet oxygen flow stream or an unsafe low oxygen purity level, the processor 70 may contact the service provider at step 140 immediately to make the appropriate physician and/or service personnel aware of the problem for immediate corrective action.

Although the invention has been shown and described with respect to a certain preferred embodiment or embodiments, it is obvious that equivalent alterations and modifications will occur to others skilled in the art upon the reading and understanding of the specification and the annexed drawings. In particular regard to the various functions performed by the above described components (assemblies, devices, compositions, etc.), the terms (including their reference to a "means") used to describe such components are intended to correspond, or unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the embodiments, as may be desired and advantageous for any given or particular application.

What is claimed is:

1. An oxygen generating system, comprising:
   an oxygen generator including an oxygen ion conducting structure;
   a heat exchanger coupled to the oxygen generator;
   a heater thermally coupled to the oxygen generator; and
   a control module coupled to the oxygen generator and the heater, wherein the control module monitors one or more system parameters and dynamically controls the operation of the oxygen generating system in response to the one or more system parameters.

2. The oxygen generating system of claim 1, wherein the oxygen ion conducting structure is a honeycomb structure.

3. The oxygen generating system of claim 2, wherein the oxygen ion conducting honeycomb structure includes a first plurality of channels which extend through a first face and a second face of the honeycomb structure and a second plurality of channels substantially parallel to the first plurality of channels, wherein the second plurality of channels are closed at the first face and the second face, respectively.

4. The oxygen generating system of claim 1, wherein the oxygen ion conducting structure comprises a ceramic.

5. The oxygen generating system of claim 4, wherein the ceramic comprises a stabilized bismuth oxide.

6. The oxygen generating system of claim 1, wherein the heater comprises at least one flat plate heater in proximity to the oxygen generator for elevating a temperature of the oxygen generator to a desired temperature range for optimal oxygen generating system performance.

7. The oxygen generating system of claim 1, further comprising a power supply coupled to the oxygen generator and the control module, wherein the power supply provides an appropriate input voltage and input current to the oxygen generator in response to one or more control signals from the control module.

8. The oxygen generating system of claim 7, further comprising an on/off/standby module coupled to the control module, wherein the on/off/standby module is operable to send an operational status signal to the control module to thereby place the oxygen generating system in either an "on" mode, an "off" mode, or a "standby" mode, respectively.

9. The oxygen generating system of claim 8, wherein the control module supplies a control signal to the power supply and the heater when the oxygen generating system is in the "on" mode, and supplies a control signal to the heater in the "standby" mode, thereby maintaining an optimal operating temperature for the oxygen generator during the "standby" mode for an efficient and substantially quick generation of oxygen when a user changes the oxygen generating system from the "standby" mode to the "on" mode.

10. The oxygen generating system of claim 1, further comprising a filter coupled to a source gas input port on the heat exchanger, wherein the filter substantially prevents an introduction of foreign matter into the oxygen generating system.

11. The oxygen generating system of claim 1, further comprising a safety valve coupled to the control module and within an outlet oxygen flow path from the heat exchanger, wherein the control module is operable to activate the safety valve and divert the oxygen generated by the oxygen generator away from a user if one or more performance parameters either exceeds or falls below a predetermined threshold.

12. The oxygen generating system of claim 11, wherein the safety valve comprises a solenoid-activated valve.

13. The oxygen generating system of claim 1, further comprising a draft module coupled to the control module and within an outlet waste gas flow path from the heat exchanger, wherein the draft module is operable to vary an amount of draft via the control module in response to one or more system parameters within the oxygen generating system, thereby maintaining the oxygen generator within an optimal temperature range.

14. The oxygen generating system of claim 13, wherein the draft module comprises a variable speed draft fan coupled to the control module, wherein when a temperature of the oxygen generator exceeds a first predetermined threshold, the draft fan speed is increased by the control module to thereby decrease the temperature of the oxygen generator, and wherein when the temperature of the oxygen generator falls below a second predetermined temperature threshold, the control module decreases the speed of the draft fan to thereby increase the temperature of the oxygen generator.

15. The oxygen generating system of claim 1, further comprising a display coupled to the control module for providing one or more visual indicia of one or more operating parameters of the oxygen generating system.

16. The oxygen generating system of claim 15, wherein the display further comprises one or more lights for providing a colored status indication of system operation to a user.

17. The oxygen generating system of claim 1, further comprising a peripheral input mechanism coupled to the control module for inputting one or more desired performance parameters into the oxygen generating system.

18. The oxygen generating system of claim 1, further comprising a modem coupled to the control module for transmitting one or more performance parameters monitored by the control module to a remote site for evaluation or trending purposes.

19. The oxygen generating system of claim 18, wherein the modem is further operable to receive an incoming call and access one or more performance parameters monitored by the control module.

20. The oxygen generating system of claim 1, wherein the control module further comprises a processor for monitoring the one or more system parameters monitored by the control module.

21. The oxygen generating system of claim 20, further comprising a memory coupled to the processor for storing one or more of the system parameters monitored by the processor.

22. The oxygen generating system of claim 21, further comprising a modem coupled to the processor, wherein the modem is operable to transmit one or more of the system parameters stored in the memory to a remote site for analysis or trending purposes.

23. The oxygen generating system of claim 22, wherein the modem is further operable to achieve a call from a remote site and access the one or more system parameters within the memory for analysis purposes.

24. A method of operating an oxygen generating system, comprising the steps of:

initializing the oxygen generating system in response to an operation status request;

generating oxygen in an oxygen ion conducting honeycomb structure in response to a desired oxygen flow rate input;

monitoring one or more oxygen generating system parameters; and controlling the oxygen generating system in response to the one or more oxygen generating system parameters.

25. The method of claim 24, wherein initializing the oxygen generating system comprises providing power to the honeycomb structure for the generation of oxygen when the operation status request indicates an ON mode.

26. The method of claim 25, wherein initializing the oxygen generating system further comprises providing power to a heater which provides heat to the honeycomb structure if a system parameter indicates the honeycomb structure is below a predetermined temperature threshold.

27. The method of claim 24, wherein initializing the oxygen generating system comprising providing power to a heater and limiting power to a power supply when the operation status request indicates a STANDBY mode, wherein the honeycomb structure is maintained substantially within an optimal temperature range although substantially no oxygen is being generated.

28. The method of claim 24, wherein initializing the oxygen generating system comprises:

initiating a flow from an output of the honeycomb structure; and supplying heat to the honeycomb structure to place the honeycomb structure within an optimal temperature range, wherein the flow aids in providing a uniform heating of the honeycomb structure.

29. The method of claim 24, wherein generating oxygen comprises supplying an input current to the honeycomb structure in response to the desired oxygen flow rate input.

30. The method of claim 24, wherein monitoring one or more oxygen generating system parameters comprises evaluating one or more sensors within the oxygen generating system, wherein the one or more sensors measure a status or parametric value reflecting an operation status of the oxygen generating system.

31. The method of claim 30, wherein the parametric values are selected from the group including a temperature, an oxygen purity level, a flow rate, an input voltage and an input current.

32. The method of claim 24, wherein the steps of monitoring one or more parameters and controlling the oxygen generating system in response to the one or more parameters comprises the steps of:

determining whether waste gases are within a predetermined temperature range; and increasing a flow rate of the outlet waste gas if the outlet waste gas temperature exceeds the predetermined temperature range.

33. The method of claim 32, further comprising the step of decreasing the flow rate of the outlet waste gas if the outlet waste gas temperature is less than the predetermined temperature range.

34. The method of claim 32, further comprising:

determining whether the flow rate of the outlet waste gas is greater than a predetermined temperature threshold if the outlet waste gas temperature falls within or exceeds the predetermined temperature range; and adding heat to the honeycomb structure if the flow rate of the outlet waste gas is less than the predetermined flow threshold and the outlet waste gas temperature is less than the predetermined temperature range.

35. The method of claim 32, wherein increasing the flow rate of the outlet waste gas comprises increasing the draft fan speed.

36. The method of claim 33, wherein decreasing the flow rate of the outlet waste gas comprises decreasing the draft fan speed.

37. The method of claim 24, wherein the steps of monitoring one or more parameters controlling the oxygen generating system in response to the one or more parameters comprises the steps of:

determining whether an outlet oxygen purity level exceeds a predetermined purity threshold; and activating a safety valve to divert a flow of the outlet oxygen from the patient if the outlet oxygen purity level is less than the predetermined purity threshold.

38. The method of claim 24, wherein the steps of monitoring one or more parameters and controlling the oxygen generating system in response to the one or more parameters comprises the steps of:

determining whether an outlet oxygen purity level exceeds or falls below a predetermined purity threshold; and activating a light of the oxygen generating system in response to the determination to thereby provide a visual indication of a condition status of the oxygen generating system.

39. The method of claim 24, wherein the steps of monitoring one or more parameters and controlling the oxygen generating system in response to the one or more parameters comprising the steps of:

determining whether an outlet oxygen purity level exceeds or falls below a predetermined purity threshold; and providing an audible signal in response to the determination to thereby provide an audible indication of a condition status of the oxygen generating system.

40. The method of claim 24, further comprising transmitting the one or more system parameters to a remote site for evaluation purposes.

41. The method of claim 40, wherein the step of transmitting the one or more system parameters to a remote site comprises:

saving the one or more system parameters in a memory;

accessing the oxygen generating system with a modem; and transmitting the system parameters from the memory to the remote site via the modem and a data link.

42. The method of claim 24, further comprising accessing the one or more system parameters from a remote site for evaluation purposes.

43. The method of claim 42, wherein the step of accessing the one or more system parameters from a remote site comprises:

saving the one or more system parameters in a memory;

accessing the oxygen generating system with a modem; and viewing the system parameters within the memory from the remote site via the modem and a data link.

* * * * *